United States Patent [19]
Berkovsky et al.

[11] Patent Number: 5,337,253
[45] Date of Patent: Aug. 9, 1994

[54] VENDING MACHINE DATA PROCESSING SYSTEM

[75] Inventors: Janette Berkovsky, Yoakum; Scott Baer, Shiner, both of Tex.

[73] Assignee: Kaspar Wire Works, Inc., Shiner, Tex.

[21] Appl. No.: 127,083

[22] Filed: Sep. 24, 1993

Related U.S. Application Data

[63] Continuation of Ser. No. 623,781, Dec. 7, 1990, abandoned.

[51] Int. Cl.⁵ .................. G06F 15/20; G06F 15/24
[52] U.S. Cl. ............................ 364/479; 194/217; 235/385; 221/2; 221/9; 340/825.35; 364/403
[58] Field of Search ............. 364/479, 478, 401–406; 235/381, 382, 385, 375; 340/825.35; 194/217; 221/2-10

[56] References Cited

U.S. PATENT DOCUMENTS

| | | | |
|---|---|---|---|
| 4,611,208 | 9/1986 | Eglise | 340/825.35 |
| 4,639,875 | 1/1987 | Abraham et al. | 364/479 |
| 4,845,484 | 7/1989 | Ellsberg | 340/825.35 |
| 4,907,250 | 3/1990 | Ricks | 364/479 X |
| 4,972,504 | 11/1990 | Daniel, Jr. et al. | 364/403 X |

OTHER PUBLICATIONS

*Single Copy Automated Systems The Future Is Now, Or Is It?* (Souther Circulation Managers Association, Tampa, Fla.) Jul. 1991 at 1,7.
*Focus on Single-Copy Computerization*, ICMA Update (International Circulation Mangers Association, Inc., Washington, D.C.) Sep. 1988 at 4,7.
*FW60 Field Worker Portable Hand Book* (Immediate Business Systems) 1987.
*TK-Electronic Single Copy Control and Forecasting* (Kaspar Wire Works, Inc.) 1989.
*Field Partner–Real World Portable Computing For Use in All Environments* (Radix Company) 1988.
*Introduction To The TK Electronic Coin Mechanism Sho-Rack Scanner And TK Advantage Software* (Kaspar Wire Works, Inc.) Jun. 20, 1990.
*Single Track–Total Control Of Your Single Copy Newspaper Sales* (Bellatrix Systems, Inc) 1990.

Primary Examiner—Joseph Ruggiero
Attorney, Agent, or Firm—Gunn, Lee & Miller

[57] ABSTRACT

A method and an apparatus for providing a manifest and a sales report for route distributors selling newspapers is disclosed. It particularly cooperates with newspaper vending racks which capture data regarding time of day for sales and sales volume. It enables a route distributor to be equipped with a portable CPU having an internally stored manifest specifying rack locations and the number of papers to be loaded at each location, sometimes known as a draw. While driving the route, stale newspapers known as returns are also collected, and this data is also input. This system therefore enables optimization of draws and distribution to increase the production of the route salesman. Moreover, data is collected in the portable CPU and is held by the CPU without requirement of sales reports or manifest on paper. The electronic data capture also improves security, and enables steps to be undertaken to reduce paper pilferage.

8 Claims, 1 Drawing Sheet

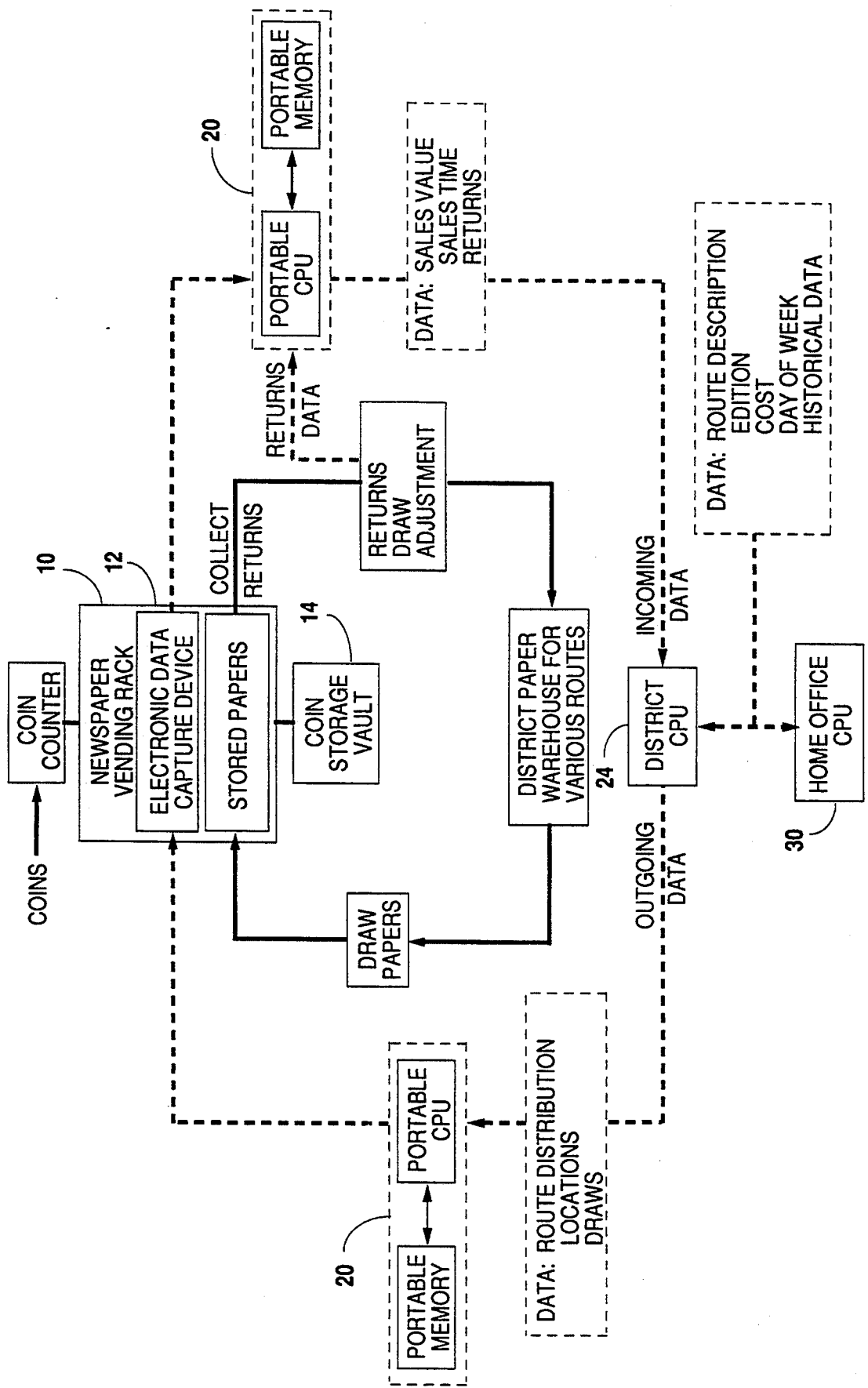

VENDING MACHINE DATA PROCESSING SYSTEM

This is a continuation of copending application Ser. No. 07/623,781 filed on Dec. 7, 1990, abandoned.

BACKGROUND OF THE DISCLOSURE

The present disclosure is directed to a vending machine data processing system which ideally finds application to newspaper vending machines, and is subject to use in other types of vending equipment, particularly those vending devices which involve route sales personnel. It is not uncommon, speaking of the context of a newspaper publisher, to have a typical distribution warehouse located in a neighborhood where there are numerous vending machine outlets for the newspaper. Sales of newspapers through vending machine racks and the like involves constant monitoring of the sales volume. Heretofore, route personnel have driven to a variety of vending machines or manned sales points, typically using a small cargo hauling truck, loaded with newspapers, to distribute the newspapers perhaps once per day, or perhaps several times as might occur assuming there are different (e.g., morning and evening edition) newspapers vended from the respective outlets. Historically, the route personnel have been required to remove the stale papers that were in the vending machine from the prior day or prior edition (they are normally called returns) and place new or fresh copies of the newspaper in the vending machine (this is normally termed the draw). The draw basically identifies the average number of papers sold from a specific vending machine over a given period of time, typically 24 hours. The number of new or fresh copies of the newspaper that are placed in the vending machine should ideally equal this average, hence the term draw. A historical draw, however, identifies the quantity of papers sold from a vending machine over a long period of time while a specific draw identifies the number of papers sold during one specific period of time. The route personnel then reset the price of the vending rack if needed, and collect the cash, usually coins in the vending machine. This is normally termed the daily sales. After becoming familiar with the route, experienced distributors can estimate sales and thereby make adjustments to the draw and hopefully optimize sales. It is advantageous to adjust the distribution at the various vending points so that returns are held to a minimum and yet the draw for each vending point is optimized to the highest practical value in light of historical trends. Historical trends can be readily learned. However, this is often word of mouth data. For instance, a vending machine located at a large factory or office building which is normally fully staffed through the five day work week and which is essentially empty on Saturday and Sunday very likely will have reduced sales for Saturday and Sunday. In similar fashion, sales points located near schools and the like can develop patterns. These patterns may repeat on a weekly basis or perhaps on some seasonal basis. The distributor can develop an estimate for this dependent on the time of year (inclement weather in winter is an impediment to certain sales), the variations resulting from vacations during the school year, and the like. All of these factors are involved in properly sizing the draw for a number of differently situated vending machines.

If the number of vending machines is either varied or the machines are reassigned between different route personnel, the distributors may not know what the draw ought to be and how to make adjustments to the draw in light of the cost of the issue, day of the week, relative timing with regard to time of day, and in accordance with other factors. Moreover, route personnel may be replaced, meaning that the history of the several vending machines on a particular route might be lost, requiring accumulation of the history. The present apparatus and the related method are intended to meet these requirements and to aid and assist route personnel in properly providing a calculated and determined draw for each of several newspaper vending racks, obtain data regarding the returns so that historical forecasts can be monitored and dynamically modified as appropriate, and to otherwise enable route personnel to distribute the draw, collect the cash, collect the returns, and to drive a familiar as well as a new or unfamiliar route on any day of the week or time of the day. Moreover, all the foregoing is accomplished without requiring the personnel to keep hand written records. Hand written records heretofore have typically included a route designation instructing a distributor to stop at a selected number of vending locations such as 40 to 60 stops. Each stop will typically be written out in some kind of sequence, typically to be driven, and each stop will normally be listed with a desired draw, and a blank is provided to list the returns. The cash heretofore has been typically recovered from a vault within the vending machine and poured into a bag or sack for the money. Typically, the total sales recovered from an outlet has been tabulated and written on a route sheet. Collectively, the several pieces of data which might be involved in evaluating a route have been termed a "manifest" which is assembled, stop to stop, with hand written entries. This is difficult to do in view of the fact that the distributor must first man-handle the newspapers placed in the rack, remove the old papers which comprise the returns, perhaps reset the price, empty the cash into some kind of bag and otherwise accomplish this either in the rain or perhaps in the twilight hours before day; all of this represents a difficult effort especially where one is required to capture data on a hand written manifest. The present system sets forth a means and method of accomplishing the foregoing. Moreover, the present system involves addresses or locations for the vending locations, identification of the particular edition, the cost (variable with edition), and the day of the week as it relates to the edition and also as it relates to the historical purchasing patterns. Moreover, historical data is used elsewhere in the system to modify the draw for the vending racks based on historical data.

The present disclosure utilizes a warehouse CPU which is ideally installed where several different newspaper distributors congregate, typically a warehouse, to pick up truck loads of newspapers for distribution as rapidly as the printed copies are available. Each route distributor is provided with a portable computer assembly which has a specified form and shape. Provided with that, and completely devoid of paper manifest sheets, the route distributor can then drive away from the distribution warehouse and begin attendance at the route newspaper vending machines. The person may not know anything about the route, having never seen the precise route before, but the portable computer carried by the distributor provides a LCD screen prompt on the first stop, the second stop, etc. where each prompt instructs that distributor for the stop. Thus, the first prompt is therefore identified as the first stop and the driver is provided with an address or other location information for the first stop. The address can be as simple as 1234 Main Street, clearly providing the distributor with the necessary information to physically locate the first vending machine. That prompt specifies the number of papers that make up the draw for that vending machine. The hand held portable computer is loaded with the price per copy information so that the distributor can drive to the first stop, carry the draw (a stack of newspapers), and load the vending machine. Also, the computer carried by the distributor (in a portable mode) is optically plugged into the vending machine. It is plugged into the vending machine to obtain data from the vending machine as will be described, and can be used also to initiate automatic opening of the vending machine. When opened, the vending machine can then be stripped of the papers from the prior day's edition, these papers making up the return, and the new edition can then be loaded. The optical coupling also sets the paper price.

The portable computer is momentarily electronically coupled to an electronic data capture system within the newspaper vending rack which is equipped with a memory and data is transferred from the memory. This data normally reports the total value of the coins which are the sales since the last loading. The memory also transfers out the time of sale information. Further, coupled with the manually determined return count, data sufficient to enable determination of pilferage is available. Additional information transferred from the route distributor by means of the portable computer includes setting a new price as needed and verification of a clock function within the vending rack to assure that the rack which otherwise operates independently of electrical connection is operated in synchronization with the system. When the distributor walks away from the vending rack, sufficient data has been captured to represent the transactions occurring at that rack and that data is momentarily held in memory for return to the memory at the warehouse CPU when the driver returns to the distribution warehouse. This data enables updating of the historical data as will be described so that the draw can be periodically adjusted dynamically with actual sales volume.

As will be further understood, the collected sales data from individual racks along the route enables verification of pilferage, shrinkage of inventory and accuracy of the reports.

One important item involved in the present disclosure is the preparation of a set of manifest sheets which is substantially accomplished without paper in the field. The manifest data or information is thus prepared by the warehouse CPU for each of several route distributors based at the warehouse. This can be adjusted on a dynamic basis each day, for instance, when particular vending racks are shifted from one route to an adjacent route. This can be adjusted so that the data on the several manifest sheets for several routes is readily available to aid and assist in equalizing or correlating the time required to drive the routes, cash collected, total number of copies per route all in accordance with other important criteria to assure proper operation of the several routes in the newspaper distribution system.

BRIEF DESCRIPTION OF THE DRAWINGS

So that the manner in which the above recited features, advantages and objects of the present invention are attained and can be understood in detail, more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

The single drawing is a schematic block diagram showing the flow of data from a newspaper vending rack having an electronic data capture system with memory where the data flows to a warehouse CPU located at a central distribution point by means of several route distributors where each distributor is provided with a portable CPU with memory, and selected data is input to the warehouse CPU to configure the routes with draw and route layout information, and also provides an output of cash collections and returns to enable financial integrity and also provides updates to the historical data configuring the route and route draws.

Attention is now directed to the drawing of the present disclosure which identifies a newspaper vending rack 10. This device is exemplified by a SHO-RACK coin operated newspaper rack (a trademark of the Assignee Kaspar Wire Works, Inc.) and is further exemplified by the various patents covering the SHO-RACK structure which include U.S. Pat. No. 235,801; U.S. Pat. No. 3,738,466; U.S. Pat. No. 3,747,733; U.S. Pat. No. 3,788,516; U.S. Pat. No. 3,831,809; U.S. Pat. No. 3,882,964; U.S. Pat. No. 3,946,848; U.S. Pat. No. 4,000,799; U.S. Pat. No. 4,037,701; U.S. Pat. No. 4,106,609; U.S. Pat. No. 4,446,956; U.S. Pat. No. 4,579,215; U.S. Pat. No. 4,693,357; U.S. Pat. No. 4,724,998; U.S. Pat. No. 4,828,097 and Canadian Patents 855,502 and 1,230,279. As further exemplified in recent models, an electronic capture data system 12 can be appended to the rack 10. This is a data capture system which is exemplified by the disclosure in Ser. No. 364,230 filed Jun. 12, 1989, now U.S. Pat. No. 5,036,966, and assigned to the common Assignee mentioned above. Data capture includes price per paper, cash collected, the time of day at which the rack is opened for paper sales, and the number of sales. This data is very useful in analysis of activities at the vending location, and the time of sales during each day. Assuming the rack is located where it is loaded once per day at approximately the same time, it can also be determined how long the rack stands empty if indeed all copies are sold. In any event, the above mentioned system places this data in computer memory for recovery. As further set forth in the foregoing disclosure, computer memory in the electronic data capture is normally enclosed within the rack 10. Also, the rack 10 encloses a vault 14 for coin storage.

The numeral 20 identifies a portable CPU with a small internal memory which typically has about 256K bytes of random access memory (RAM). The preferred embodiment of the portable device is manufactured by a firm known as Immediate Business Systems plc of England and is marketed the U.S. by the Radix Corporation and is sold under the trademark of FieldPartner. That CPU includes a visible keyboard and rectangular screen. The structure stands approximately eight inches in length, approximately three and one half inches in width and is approximately two inches thick. The internal components are enclosed by a water proof cabinet or housing to operate in high humidity at temperatures up to about 120° F. It comprises a low power consumption CMOS computer which responds to a Z80 instruction set and preferably has a main processor which is Model HD64180 by Hitachi and is constructed with a CMOS type RAM memory having any size from about 256K up to about one megabyte of memory. It normally runs on internal battery power and is furnished with a twenty-one key exposed keyboard. It is provided with a lighted LCD display which provides four lines of data, twenty characters per line or eighty characters. It is also equipped with standard RS232 ports and is capable of providing an output through the ports in accordance with an established protocol for connection with a bar code reading device, printer, or data transfer to a warehouse CPU 24. In the preferred embodiment, however, the CPU 20 has an input device which is an infrared sensor which couples with an optical source in the electronic data capture apparatus 12. A momentary line of communication is established between the memory and the electronic data capture mechanism 12 and the portable CPU 20. Moreover, data transfer from the memory in the electronic data capture means 12 into the memory of the CPU 20 is occasioned by regular operation. An example of this will be given hereinafter.

The portable CPU 20 is thus described as a hand held device with a lighted screen which provides an output of a sufficient number of characters. The use of the screen and significance of the prompt to the route distributor will be more apparent hereinafter. The CPU 20 is provided with an optically coupled input and output port, that is, with a probe which has physical integrity, i.e., a closed housing where reading occurs though a covered transparent eye capable of blocking water entry and yet permitting light transmission therethrough for optical coupling. Optical coupling is made into and out of the portable CPU 20. In part, it couples with the electronic data capture means 12 to obtain information from the memory thereof. This enables the data to be transferred from the memory in the electronic data capture means 12 into the portable CPU 20 and finally into the warehouse CPU 24. This CPU 24 is also equipped with a suitable memory for holding all the data to be described. Moreover, it is provided with the software to accomplish the routines described below.

By way of background, it should be recalled that there are usually several distributors operating from a single distribution point, all of whom may have access to the CPU 24. Assume, for purposes of description, that there are M distributors. Assume further that each one has a route of up to N rack locations to be serviced. Routes may also include manned sales locations without racks; hence, they are included in the route even though the sales location may not be equipped with the electronic data capture device. The total number of potential rack or other distribution locations is then M times N. These locations are specified, that is, they are described by location on a manifest and sufficient data is in memory to dispatch the M distributors to all locations. In many instances, this will be a simple street location such as 2345 Main Street. It may be more definitive, perhaps identifying the Rexall Drug Store at that corner. It may be definitive in a different fashion with other descriptive information to set out the location of the vending rack or manned dealer. Thus, a manifest is loaded into the CPU 24.

Another important information loaded into the CPU 24 is the particular edition, that is, identification of the time of day for which the paper is normally distributed, and the cost of that edition. Sometimes price can be encoded in the day of the week, for instance, the customary higher cost of a Sunday paper. Last of all, the historical data is used to modify the draw for a series of vending points. This information is stored in the warehouse CPU 24 which executes a routine which will be exemplified with regard to the manifest described below. The term manifest is applied to a set of instructions for a route distributor including locations and draws; capture of data by a route distributor enables manifest updating. With the manifest, a person is assigned a set of vending points and drives from location to location, loading each with the draw, removing the returns, collecting the cash and resetting the equipment. Other maintenance and observations might be also undertaken. The collected data is of great value in making a prediction of the draw for corresponding future dates. For instance, a week day draw is not necessarily the same as a Saturday draw, or a Sunday draw. These may go up or down depending on the location. Examples of this will be worked out with Table 1 attached which is a daily sales report. A manifest primarily includes the data in the left columns, namely, location identification, draw, and sequence of locations.

The sales report includes several columns of data. They should be individually considered. First of all, the data of Table 1 includes the date on which the various racks are loaded and in this example, the date is located at the upper left and is May 22, 1990. The next entry is the serial number of the electronic data capture means 12. Each of these devices is provided with a unique serial number so that it can be recorded in the portable CPU. This serial number provides the necessary identification of the vending rack or facility. The next column is the location of the rack or other vending point. As shown, street addresses are sufficient in most instances. The next two columns are the draw and returns for the particular day. The returns represent stale or unsold inventory. After the percentage return calculation derived from the prior two columns, the next entry is the quantity sold from the location. A loss number is also calculated. The loss number reflects those newspapers taken where two or more are removed from the vending rack at one opening; the loss column therefore reflects the pilferage out of the rack. The next column is the dollar sales value. That is, the amount of money indicated by the data means 12 to be available in the vault 14. That money is removed from the storage vault 14 by the distributor. The next column is the time of day at which the draw is loaded into the machine. The next three columns represent the time at which sales occur. One is labelled the first sale which is the first sale occurring immediately after loading of the draw. Two added entries are the last two sales. A column is also included which indicates whether or not the rack sold out, and the last column is the account numbers of the particular vending racks. In the latter, several racks may be assigned to particular owners or perhaps may be involved in overriding rental charges from location owners and the like.

The report of Table 1 includes at the bottom a set of totals which total selected columns including the draw and return columns. It also provides an indication of the number actually sold versus the number lost by pilferage and the gross dollar value of the sales.

Variations in the handling of the report created in Table 1 will be discussed hereinafter. Table 2 is a very useful set of data obtained from the data captured at the various vending rack locations. As will be understood, the electronic data capture means 12 records the time of day at which a sale is made. The time of day information is quite valuable because it can be used to diagnose when sales might occur, when the rack sold out, perhaps when pilferage might occur and other valuable information. Table 2 shows a breakout of the sales day into time increments of 1.5 hours, and assigns the individual sales to these time increments as recorded by the data capture means 12; entries are included for all the vending machines on the route which is exemplified in Table 1. The distribution of sales over the time span is useful to determine the requisite load instructions.

Table 2 thus shows the time intervals at the top of the table and unit sales during that time interval in several columns and then represents the total sold, the location of the vending machine, the serial number, edition number (see also Table 1 for similar data), the date in which the issue was loaded and the date at which the information was retrieved. The last date is labelled the audit date in Table 2. Table 3 is a representative manifest showing in column format the sequence of stops, location of the steps, description of the stop, edition and draw. This example can be extended for several routes.

Consider draw variations as a result of historical data which is used in an algorithm by operation of the CPU 24. The algorithm may simply be an averaging of individual draws (i.e. the daily amount of papers sold) based on historical data subject to distinctions between days of the week and periods of the year, or the algorithm may factor in any number of additional bits of information that are commonly used in the industry to adjust and optimize sales and returns. The ultimate goal of such draw adjustment is to reduce the average number of returns and at the same time not leave a vending machine empty in the face of a sale. Assume for purposes of description that data at a particular vending machine is captured over a time period of one year. Assume further that the data includes the time of the day at which individual unit sales occurs; with this data, a projection of the appropriate rack sales potential can then be determined. This is used to determine the number of issues sold from that rack and other pertinent information. Consider, however, the application of the algorithm to one of the vending locations exemplified in Tables 1 and 2. Assume that it is the first entry which is Star Enterprise in the representative list of Table 1. Assume that historical data at Star Enterprise reveals that this indoor vending facility is closed on all holidays but is otherwise open. The algorithm for the draw for that vending location would set the quantity to zero on holidays. If the rack were located at a place closed on Sundays but open the remaining six days, the draw would be set equal to zero for Sundays. Taking another example, assume that the rack at Revco in Table 1 is a vending machine immediately in front of a manufacturing plant which normally works five days per week. The responsive algorithm reduces the draw for Saturdays and Sundays substantially to zero, but the draw is permitted to increase to the quantity close to the number for sell out. While there might be variations through the week, Monday versus Thursday, etc., the algorithm observes the quantity and the time of the last sale of the day to assure that the rack is adequately supplied to meet the demand for that location. Assume, in this example, that the number of copies actually sold is tabulated for one year in the algorithm. During that year, the manufacturing plant might shut down for two weeks for vacation, perhaps retooling, or observe some other annual interruption. While this might not be predicted during the year of observation, this data can be learned by observation of the report at Table 1 when the data is available for a full year. This algorithm provides the necessary instructions that the draw ought to be reduced, perhaps reduced to zero, at least during the annual vacation or shut down.

Assume, as a further example, that the rack located at the VIP Apartment (Table 1) sells primarily to pedestrian traffic which in turn is dependent on the school year. The data might readily show a summer-slump in sales. Assume, as another example, that one vending rack is located in a residential neighborhood while another vending rack is located in front of an apartment complex. Sales fluctuate downwardly on Sunday for the neighborhood rack while they fluctuate upwardly for the rack in front of the apartment complex. Fluctuations of this general nature which are impacted by the immediate population and purchasing habits of that population can be accumulated and the necessary draw for these several locations can then be determined. This might vary widely depending on cost and edition during the week and perhaps can vary even more in contrast between the week day draw and Saturday or Sunday draws. In any event, the precise draw for the racks can be determined by taking advantage of the year's accumulation of data. This is accomplished by storing the sales volume for the rack throughout the year. This data is stored so that the sales volume can be analyzed in light of factors which impact that volume. This can be used to provide a projected draw for each of the several racks making up the route which is described in the report of Table 1. Alternately, on Saturdays, perhaps on Sundays, perhaps on both days, the draw drops to zero and the route can then be reconfigured so that the distribution is modified for selected days such as holidays, Sunday and the like. Several vending rack locations can be reallocated to a single distributor so that the driving routes are modified. For instance, Table 1 lists six vending machines located on Speedway Street at locations ranging from the 3000 block to the 4400 block. Assume that all these are located adjacent a college campus. If the campus becomes substantially inactive in the summer time, the draw at all these racks might drop to zero so that they could be removed and the entire route can be redetermined, simplified and shortened. As will be understood, these algorithms can be implemented in different fashions between days of the week, different dates and different seasons. Alternately, data in Table 1 coupled with Table 2 which shows the time of day of sales, is used in the event that the newspaper publishes two separate editions, for instance, a morning edition which is distributed from 5:00 a.m. to 11:00 a.m. and an afternoon edition which is distributed from 3:00 p.m. to 8:00 p.m.. Of course, other bases for distribution of the draw between times of day and days of the week can be implemented by placing such historical data in the memory so that the draw for a given day is tabulated in the fashion of the draw listed in Table 1 in that column.

As shown in the single drawing, the district CPU 24 connects with the larger home office CPU 30 to enable keeping of history for a whole year or longer. The home office CPU typically will provide larger data reports such as the reports for summing up many, perhaps all vending routes, etc. and is thus provided with data transferred between the computers 24 and 30. This data typically includes the data occurring on a daily basis which leads to the collection of historical data and the preparation of draw for the individual racks, and route maps for multiple racks. This enables the district CPU 24 to create the manifest which is primarily the listing of specific vending rack locations and the sequence in which they are delivered. It also provides the daily draw for the respective racks. Thus, the manifest which is created is normally not formed in hard copy but has the form of data transferred from the CPU 24 to the portable CPU 20. In effect, this is a soft copy of the manifest. The manifest however is not seen by the route driver or distributor as a single document. Rather, it is displayed on the screen of the portable CPU in a fashion which serves as instructions on driving the route. In effect, it is displayed in a sequence that can be laid out for the most efficient driving routine. This routine is devised by the CPU 30 or alternately by the CPU 24. The manifest (in electronic form) is transferred to the CPU 20 which is then stored in memory and is carried in the CPU 20 during travel. As shown in the single drawing, communications with the CPU 20 is illustrated both on the left and on the right. On the left, this shows the flow of data and the parallel flow of papers. Thus, the route driver gets the CPU 20 loaded with the manifest in data form, and also collects a requisite number of papers. As the route is driven, the papers are distributed in accordance with stored manifest data. The right hand side of the drawing shows the same CPU 20. On the left, it is using manifest instructions to carry out the paper distribution to the various vending racks. On the right, it is collecting the data from the electronic data capture device 12 at each of the racks 10. Additional data is input, namely, the route distributor inputs the number of returns recovered from an individual vending rack. Return data is useful to draw adjustment which can be made as simply as decreasing the Tuesday draw by the Monday returns, or by use of historical data processed in the CPU 24 and executed with each draw. Thus, data regarding the returns and also regarding the sales is input to the CPU 20 from the individual racks. Sales data includes the time of day and the aggregate dollar value of sales. It is sufficient data to enable filling out the various columns shown in the sales report of Table 1. The route driver is thus able to collect this data as illustrated on the right side of the only drawing while simultaneously collecting the returns. The drawing therefore shows the travel or route of the driver including the two lengths of data which are both accomplished through the portable CPU 20. It also shows the flow of the paper, particularly where it travels out as a draw and is returned as returns.

Through various algorithms at the CPU 30, the historical data for days, weeks, or years can be collected and converted into routines which are transferred to the CPU 24 which thereby enable calculation of a manifest.

One feature of the present system is that it works well with all types of equipment. In some instances, the newspaper vending rack 10 may not have the electronic data capture device 12. For instance, this might occur where a convenience store has clerical personnel in attendance. Accordingly, the papers are then loaded in the convenience store. The returns collected, but no data transfer is accomplished. Even in that instance, hand input data can be accomplished. That is, the number of returns is input to the portable CPU 20 in same fashion as with a vending rack.

As will be further understood, the system of the present disclosure can be used to accommodate variations in sales with respect to times of day. For instance, a morning newspaper may determine that the bulk of its sales remain before 8 a.m. typically to people on their way to work. Nevertheless, it may discover that there are other locations where a later morning addition can be sold during the day, perhaps between the hours of 11 a.m. and 3 p.m. In this example, a different edition can be implemented for delivery through different locations, i.e. through a different distributor route involving a different mix of the vending racks. Where pilferage seems to occur, this can be narrowed quite readily by the data capture which includes sales and in particular the time of day at which sales occur. Accordingly, security provisions can be altered to reduce or eliminate theft and pilferage.

While the foregoing is directed to the preferred embodiment, the scope of the present disclosure set forth in the claims which follow.

TABLE 1

DAILY REPORT SALES

TK ADVANTAGE STANDARD REPORT

| Load Date | Serial/Ed | Location | Draws | Retns | % Returns | Qty. Sold | Loss | $ Sales | Load Time | First Sale | Last Two Sale Times | Sell Out | Account |
| --- | --- | --- | --- | --- | --- | --- | --- | --- | --- | --- | --- | --- | --- |
| 5/22/90 | | | | | | | | | | | | | |
| | 1/1 | Star Enterprise | 5 | 1 | 20.00 | 4 | 0 | 0.00 | 05:17 | Stor | | K | 0149904 |
| | 3/1 | Stop K Co | 15 | 0 | 0.00 | 15 | 0 | 2.22 | 03:26 | Stor | | Y | 0741786 |
| | 4/1 | Proktos | 23 | 4 | 17.33 | 19 | 0 | 2:02 | 05:29 | Stor | | K | 3763587 |
| | 164309/1 | Bus Stop 3400 Spdwy. | 5 | 3 | 60.00 | 1 | 1 | 0.35 | 03:33 | 10:54 | 0:00/10:54 | K | 4428004 |
| | 164700/1 | Jester Vest | 15 | 0 | 0.00 | 8 | 7 | 2:60 | 04:40 | 6:12 | 8:12/8:00 | Y | 4895495 |
| | 177074/1 | St. David Pl. 920 E 32 | 2 | 2 | 100.00 | 0 | 0 | 8.00 | 04:12 | 0:00 | 0:28/0:00 | K | 7132259 |
| | 177275/1 | Special Evt | 3 | 0 | 0.00 | 2 | 1 | 0.70 | 04:43 | 8:02 | 8:08/10:12 | Y | 5188113 |
| | 177076/1 | Kwik Wash | 5 | 1 | 20.00 | 4 | 8 | 1:95 | 02:49 | 7:30 | 19:00/18:42 | K | 3239001 |
| | 177078/1 | VIP APTS | 10 | 0 | 2.20 | 8 | 2 | 0:60 | 03:34 | 8:25 | 8:30/8:26 | K | 4419995 |
| | 17079/1 | Master Valet | 23 | 0 | 24.78 | 10 | 5 | 3:70 | 03:36 | 8:48 | 0:48/0:24 | K | 4867408 |
| | 177000/1 | Bus Stop 3020 Spdvt. | 5 | 0 | 0.00 | 5 | 0 | 1.75 | 03:38 | 6:06 | 7:48/9:48 | Y | 4419817 |
| | 177081/1 | Corner Rack 2700 Spd | 4 | 0 | 0.00 | 3 | 1 | 1.40 | 03:54 | 6:18 | 7:42/18:36 | Y | 4419987 |
| | 177082/1 | Revco | 5 | 0 | 0.00 | 5 | 0 | 1.80 | 02:53 | 7:24 | 16:54/19:18 | Y | 3763749 |
| | 177083/1 | Concordia C 3400 | 7 | 0 | 0.00 | 6 | 1 | 2:10 | 04:16 | 8:12 | 13:36/11:18 | Y | 7769326 |

TABLE 1-continued

| | | K I | | | | | | | | | | | |
|---|---|---|---|---|---|---|---|---|---|---|---|---|---|
| 177084/1 | Wyatts Cafe | | 15 | 5 | 42.20 | 9 | 0 | 3:15 | 02:51 | 11:48 | 18:24/19:49 | K | 3763714 |
| 177087/1 | Bus Stop 4400 Red R. | | 6 | 2 | 33.33 | 4 | 0 | 1:40 | 03:00 | 3:18 | 8:38/9:06 | K | 4419839 |
| 177089/1 | Tanglewood Apts | | 6 | 0 | 0.00 | 3 | 3 | 1:05 | 03:22 | 6:30 | 8:48/13:36 | Y | 3763935 |
| 177063/1 | Mt Amigo | | 6 | 4 | 66.67 | 1 | 1 | 0:05 | 03:04 | 8:36 | 8:36/0:00 | K | 5247934 |
| 177092/1 | Mothers | | 7 | 2 | 28.57 | 5 | 0 | 1.75 | 03:11 | 7:00 | 13:36/13:12 | K | 3763595 |
| 177031/1 | Dutal Cleaners | | 8 | 2 | 25.00 | 5 | 1 | 1.50 | 03:13 | 5:48 | 16:24/14:36 | K | 3763609 |
| 177092/1 | Dishukes Drugs | | 25 | 4 | 16.00 | 20 | 1 | 7:15 | 03:15 | 5:54 | 19:24/19:30 | K | 3763579 |
| 177033/1 | Minimax | | 17 | 4 | 23.53 | 13 | 0 | 4:20 | 03:17 | 7:18 | 19:54/7:18 | K | 3763560 |
| 177034/1 | Jester East | | 8 | 6 | 75.22 | 1 | 1 | 0.35 | 05:54 | 9:24 | 9:24/0:00 | K | 3783450 |
| 177095/1 | Corner Rack 4500 Sfd | | 2 | 0 | 0.00 | 2 | 0 | 0.78 | 00:21 | 11:18 | 11:18/17:54 | Y | 4419820 |
| 177097/1 | Corner Rack 4200 Sfd | | 3 | 0 | 0.23 | | 0 | 1:05 | 03:25 | 6:49 | 0:00/0:00 | Y | 4419812 |
| 177008/1 | Bus Stop 4420 Spdwy. | | 3 | 0 | 0.00 | 3 | 0 | 1.10 | 03:27 | 11:30 | 12:86/16:42 | Y | 5532507 |
| 177122/1 | Kinkos Copies | | 12 | 0 | 0.00 | 10 | 2 | 3:58 | 03:58 | 7:24 | 12:42/11:12 | Y | 3227498 |
| 177102/1 | Bus Stop 3128 Red R. | | 3 | 2 | 0.00 | 3 | 0 | 1.05 | 04:02 | 6:18 | 6:35/8:08 | Y | 3177060 |
| 177259/I | UT Law | | 12 | 5 | 41.07 | 5 | 2 | 1.75 | 03:56 | 13:42 | 17:00/16:30 | K | 3211088 |

03/22/90 TOTALS:

| DRAWS: | RETURNS: | % RETURNS: | SOLD: | LOSS: | $ SALES |
|---|---|---|---|---|---|
| 260 | 54 | 58.77 | 177 | 29 | $47.20 |

DAILY REPORT TOTALS:

| DRAWS: | RETURNS: | % RETURNS: | SOLD: | LOSS: | $ SALES |
|---|---|---|---|---|---|
| 260 | 54 | 58.77 | 177 | 29 | $47.20 |

TABLE 2
TIME ZONES SALES REPORT

TK ADVANTAGE
STANDARD REPORT
Total

| 0 | 5.5 | 7.0 | 8.5 | 10.6 | 11.5 | 13.0 | 14.5 | 16.0 | 17.5 | 19.0 | 20.5 | 4.0 | Qty. |
|---|---|---|---|---|---|---|---|---|---|---|---|---|---|
| 0 | 0 | 0 | 0 | 1 | 0 | 0 | 0 | 0 | 0 | 0 | 0 | 0 | 1 |
| 1 | 4 | 3 | 0 | 0 | 0 | 0 | 0 | 0 | 0 | 0 | 0 | 0 | 8 |
| 0 | 0 | 0 | 0 | 0 | 0 | 0 | 0 | 0 | 0 | 0 | 0 | 0 | 0 |
| 0 | 0 | 1 | 0 | 0 | 0 | 0 | 0 | 1 | 0 | 0 | 0 | 0 | 2 |
| 0 | 0 | 0 | 1 | 0 | 0 | 0 | 0 | 0 | 0 | 0 | 1 | 2 | 4 |
| 0 | 0 | 1 | 1 | 0 | 0 | 0 | 0 | 0 | 0 | 0 | 0 | 6 | 8 |
| 0 | 0 | 1 | 0 | 0 | 0 | 0 | 0 | 0 | 3 | 0 | 0 | 6 | 10 |
| 0 | 0 | 0 | 1 | 3 | 0 | 1 | 0 | 0 | 0 | 0 | 0 | 0 | 5 |
| 0 | 1 | 1 | 0 | 0 | 0 | 0 | 0 | 0 | 1 | 0 | 0 | 0 | 3 |
| 0 | 0 | 1 | 0 | 1 | 1 | 0 | 0 | 1 | 0 | 1 | 0 | 0 | 5 |
| 0 | 0 | 1 | 2 | 2 | 0 | 1 | 0 | 0 | 0 | 0 | 0 | 0 | 6 |
| 0 | 0 | 1 | 2 | 0 | 0 | 0 | 0 | 0 | 0 | 0 | 0 | 1 | 4 |
| 0 | 1 | 0 | 1 | 0 | 0 | 1 | 0 | 0 | 0 | 0 | 0 | 0 | 3 |
| 0 | 0 | 0 | 1 | 0 | 0 | 0 | 0 | 0 | 0 | 0 | 0 | 0 | 1 |
| 0 | 0 | 1 | 0 | 0 | 2 | 2 | 0 | 0 | 0 | 0 | 0 | 0 | 5 |
| 0 | 1 | 0 | 1 | 0 | 0 | 1 | 1 | 1 | 0 | 0 | 0 | 0 | 5 |
| 1 | 1 | 3 | 4 | 3 | 2 | 2 | 0 | 2 | 0 | 2 | 0 | 0 | 20 |
| 0 | 0 | 1 | 0 | 0 | 0 | 0 | 0 | 0 | 0 | 1 | 11 | 0 | 13 |
| 0 | 0 | 0 | 1 | 0 | 0 | 0 | 0 | 0 | 0 | 0 | 0 | 0 | 1 |
| 0 | 0 | 0 | 0 | 1 | 0 | 0 | 0 | 0 | 1 | 0 | 0 | 0 | 2 |
| 0 | 2 | 0 | 0 | 1 | 0 | 0 | 0 | 0 | 0 | 0 | 0 | 0 | 3 |
| 0 | 0 | 0 | 0 | 0 | 2 | 0 | 0 | 1 | 0 | 0 | 0 | 0 | 3 |
| 0 | 0 | 3 | 3 | 2 | 1 | 0 | 0 | 0 | 0 | 0 | 0 | 1 | 10 |
| 0 | 2 | 1 | 0 | 0 | 0 | 0 | 0 | 0 | 0 | 0 | 0 | 0 | 3 |
| 0 | 1 | 0 | 0 | 0 | 0 | 1 | 1 | 2 | 0 | 0 | 0 | 0 | 5 |

Totals for start time: 4.0/interval time: 1.5

| 2 | 13 | 19 | 18 | 14 | 8 | 9 | 3 | 10 | 5 | 5 | 33 | 139 |
|---|---|---|---|---|---|---|---|---|---|---|---|---|

| Location | Serial | Ed | Load Date | Audit Date |
|---|---|---|---|---|
| Bus Stop 3420 Spdwy. | 164303 | 1 | 05/22/90 | 05/23/90 |
| Jester West | 164700 | 1 | 05/22/90 | 05/23/90 |
| St. David Fl. 928 E 32 | 177074 | 1 | 05/22/90 | 05/23/90 |
| Special Evt. | 177075 | 1 | 05/22/90 | 05/23/90 |
| Kwik Wash | 177076 | 1 | 05/22/90 | 05/23/90 |
| VIP Apts. | 177070 | 1 | 05/22/90 | 05/23/90 |
| Master Valet | 177079 | 1 | 05/22/90 | 05/23/90 |

TABLE 2-continued
TIME ZONES SALES REPORT

|  |  | Bus Stop 3000 Spdwy. | 177000 | 1 | 05/22/90 | 05/23/90 |
|---|---|---|---|---|---|---|
|  |  | Corner Rack 2700 Spd | 177001 | 1 | 05/22/90 | 05/23/90 |
|  |  | Revco | 177092 | 1 | 05/22/90 | 05/23/90 |
|  |  | Concordia C. 3400 W I | 177003 | 1 | 05/22/90 | 05/23/90 |
|  |  | Wyatts Cafe | 177004 | 1 | 05/22/90 | 05/23/90 |
|  |  | Bus Stop 4400 Red R. | 177007 | 1 | 05/22/90 | 05/23/90 |
|  |  | Tanglewood Apts. | 177008 | 1 | 05/22/90 | 05/23/90 |
|  |  | Mi Amigo | 177009 | 1 | 05/22/90 | 05/23/90 |
|  |  | Mothers | 177010 | 1 | 05/22/90 | 05/23/90 |
|  |  | Duval Cleaners | 177091 | 1 | 05/22/90 | 05/23/90 |
|  |  | Dishukes Drugs | 177092 | 1 | 05/22/90 | 05/23/90 |
|  |  | Minimax | 177093 | 1 | 05/22/90 | 05/23/90 |
|  |  | Corner Rack 4508 Spd | 177095 | 1 | 05/22/90 | 05/23/90 |
|  |  | Corner Rack 4200 Spd | 177097 | 1 | 05/22/90 | 05/23/90 |
|  |  | Bus Stop 4400 Spdwy. | 177098 | 1 | 05/22/90 | 05/23/90 |
|  |  | Kinkos Copies | 177100 | 1 | 05/22/90 | 05/23/90 |
|  |  | Bus Stop 3180 Red R. | 177102 | 1 | 05/22/90 | 05/23/90 |
|  |  | UT Law | 177099 | 1 | 05/22/90 | 05/23/90 |

TABLE 3
EXAMPLE ROUTE MANIFEST
Route: 12345

| Stop# | Location Name | Description | Edition | Draw |
|---|---|---|---|---|
| 101 | RACK- 31st & Main St | (SouthWest Corner) | 1 | 12 |
| 102 | RACK- 31st & Maple | Outside H.E.B. North | 1 | 15 |
| 103 | OTC- Jones Hospital | 3505 Speedway Drive | 1 | 38 |
| 104 | RACK- Baptist Church | 3500 Gray Street NE | 1 | 18 |
| 105 | OTC- Al's Quick-Stop | 3620 Jones Street NE | 1 | 45 |
| 106 | RACK- 35th & College | (NorthWest Corner) | 1 | 8 |
| 107 | RACK- Church & Main | (SouthEast Corner) | 1 | 14 |
| 108 | OTC- Waldenbooks | (Inside Garden Mall) | 1 | 35 |
| 109 | RACK- Church & 32nd | (Outside 1st Bank) | 1 | 9 |
| 110 | RACK- 33rd & Hwy 95 | at Bill's Donuts | 1 | 21 |

We claim:

1. A method for processing and displaying information received from, and transmitted to, a plurality of vending machines at different locations and controlling delivery of product into said vending machines, comprising the steps of:

(a) storing a sequential list of said locations of each of said vending machines in a portable data storage unit, said portable data storage unit having means for individually displaying each of said locations;

(b) storing a first quantity of product to be delivered to each of said vending machines in said portable data storage unit, said portable data storage unit having means for individually displaying said first quantity of product for each of said vending machines in conjunction with said location for said vending machine;

(c) displaying in sequence or at random each of said locations and said first quantities of product to be delivered to said vending machines on said portable data storage unit;

(d) accessing in sequence or at random each of said vending machines as said locations for said vending machines are displayed on said portable data storage unit for a delivery of product into said vending machines and a retrieval of information from said machines;

(e) at each of said vending machines, storing in said portable data storage unit a second quantity of said product dispensed as sales from said vending machine;

(f) at each of said vending machines, storing in said portable data storage unit a third quantity of said product remaining unsold in said vending machine;

(g) removing said third quantity of said product from said vending machine; and (h) delivering said first quantity of said product into said vending machine.

2. The method of claim 1 wherein said steps of storing said second and third quantities of said product comprise the steps of:

(a) establishing a data communication link between said portable data storage unit and a cooperative electronic data capture device within each of said plurality of vending machines;

(b) verifying an identity of each of said plurality of vending machines by a coded communication between said portable data storage unit and said electronic data capture device;

(c) retrieving said second quantity of said product from said electronic data capture device;

(d) entering said third quantity of said product into a numeric keypad on said portable data storage unit; and (e) storing said second quantity of said product and said third quantity of said product in a memory device within said portable data storage unit.

3. The method of claim 1 further comprising the steps of:

at each of said vending machines, recording a plurality of time values associated with each of said products dispensed as sales from said vending machine; and at each of said vending machines, recording a total money amount deposited into said vending machine.

4. The method of claim 1 wherein said step of storing a first quantity of product to be delivered to each of said vending machines is accomplished by downloading said first quantities from a central processing unit.

5. The method of claim 1 wherein said step of storing a first quantity of product to be delivered to each of said vending machines is accomplished by entering said first quantities through a numeric keypad on said portable data storage unit.

6. The method of claim 1 further comprising the steps of:
(i) maintaining a total of said first quantities of product to be delivered to all of said vending machines in said portable data storage unit;
(j) maintaining a total of said second quantities of product dispensed as sales from all of said vending machines in said portable data storage unit; and
(j) maintaining a total of said third quantities of product remaining unsold from all of said vending machines in said portable data storage unit.

7. The method of claim 1 further comprising the step of: at each of said vending machines, removing monies received for sales from said vending machine.

8. The method of claim 1 further comprising the step of: at each of said vending machines, setting a cost per product in said vending machine with said portable data storage unit.

* * * * *